United States Patent
Gatson et al.

(10) Patent No.: US 9,946,981 B2
(45) Date of Patent: Apr. 17, 2018

(54) COMPUTING DEVICE SERVICE LIFE MANAGEMENT

(71) Applicant: Dell Products, LP, Round Rock, TX (US)

(72) Inventors: Michael S. Gatson, Austin, TX (US); Joseph Kozlowski, Hutto, TX (US); Yuan-Chang Lo, Austin, TX (US); Nikhil M. Vichare, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 224 days.

(21) Appl. No.: 14/789,823

(22) Filed: Jul. 1, 2015

(65) Prior Publication Data
US 2017/0004421 A1    Jan. 5, 2017

(51) Int. Cl.
| | | |
|---|---|---|
| *G06F 15/173* | (2006.01) | |
| *G06Q 10/06* | (2012.01) | |
| *H04L 12/24* | (2006.01) | |
| *H04L 12/26* | (2006.01) | |

(52) U.S. Cl.
CPC ......... *G06Q 10/06* (2013.01); *H04L 41/5038* (2013.01); *H04L 41/145* (2013.01); *H04L 43/065* (2013.01)

(58) Field of Classification Search
None
See application file for complete search history.

(56) References Cited

U.S. PATENT DOCUMENTS

| | | | | |
|---|---|---|---|---|
| 5,027,268 A * | 6/1991 | Sakurai | G07C 3/00 700/79 | |
| 5,648,919 A * | 7/1997 | Yamauchi | G07C 3/00 703/6 | |
| 6,704,689 B1 * | 3/2004 | Hogan | G06Q 10/06 702/182 | |
| 7,689,850 B2 | 3/2010 | Cantwell et al. | | |
| 7,706,928 B1 | 4/2010 | Howell et al. | | |
| 7,873,485 B2 | 1/2011 | Castelli et al. | | |
| 8,230,245 B2 | 7/2012 | Khatri et al. | | |
| 8,799,695 B2 * | 8/2014 | Belt | G06F 1/3203 713/323 | |
| 2002/0065698 A1 * | 5/2002 | Schick | B61L 27/0094 705/7.36 | |
| 2002/0072928 A1 * | 6/2002 | Sundararajan | G06Q 10/06 705/26.1 | |
| 2003/0014226 A1 * | 1/2003 | Loecher | G06Q 10/06 703/2 | |
| 2003/0055666 A1 * | 3/2003 | Roddy | B61L 27/0094 705/305 | |
| 2003/0074244 A1 * | 4/2003 | Braxton | G06Q 10/06 705/412 | |
| 2004/0059694 A1 * | 3/2004 | Darken | G06Q 10/10 706/21 | |
| 2005/0005186 A1 * | 1/2005 | Goebel | G06Q 10/06 714/1 | |
| 2007/0239368 A1 * | 10/2007 | Marrano | G06Q 10/06 702/34 | |
| 2008/0059643 A1 | 3/2008 | Moss | | |
| 2008/0082345 A1 * | 4/2008 | Greiner | G06Q 10/06 705/305 | |
| 2008/0271113 A1 | 10/2008 | Belling | | |
| 2009/0006153 A1 * | 1/2009 | Greiner | G06Q 10/06 705/305 | |
| 2009/0157333 A1 | 6/2009 | Corrado et al. | | |
| 2009/0259507 A1 * | 10/2009 | Miwa | E02F 9/20 705/7.24 | |
| 2012/0154171 A1 | 6/2012 | Hurri et al. | | |
| 2013/0294291 A1 | 11/2013 | Rasanen | | |
| 2015/0039269 A1 * | 2/2015 | Mejegard | G06Q 10/06 702/182 | |

* cited by examiner

*Primary Examiner* — Brian Whipple
(74) *Attorney, Agent, or Firm* — Prol Intellectual Property Law, PLLC; H. Kenneth Prol

(57) ABSTRACT

A method and information handling system for obtaining information handling system wear parameter values representative of wear of the information handling system, the information handling system wear parameter sensors comprising a motherboard event wear parameter sensor for obtaining motherboard event wear parameter values, a component event wear parameter sensor for obtaining component event wear parameter values, and a usage wear parameter sensor for obtaining usage wear parameter values, for calculating client information handling system wear based on the information handling system wear parameter values and the statistical model of wear estimation, and for providing a service life indication for the client information handling system, the service life indication indicative of a disposition suitability.

20 Claims, 9 Drawing Sheets

COMPUTING DEVICE SERVICE LIFE MANAGEMENT

CROSS REFERENCE TO RELATED APPLICATIONS

Related subject matter is contained in co-pending U.S. patent application Ser. No. 14/789,847 entitled "Information Handling System Configuration Parameter History Management," filed on Jul. 1, 2015, the disclosure of which is hereby incorporated by reference.

FIELD OF THE DISCLOSURE

The present disclosure generally relates to information handling systems, and more particularly relates to service life management for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
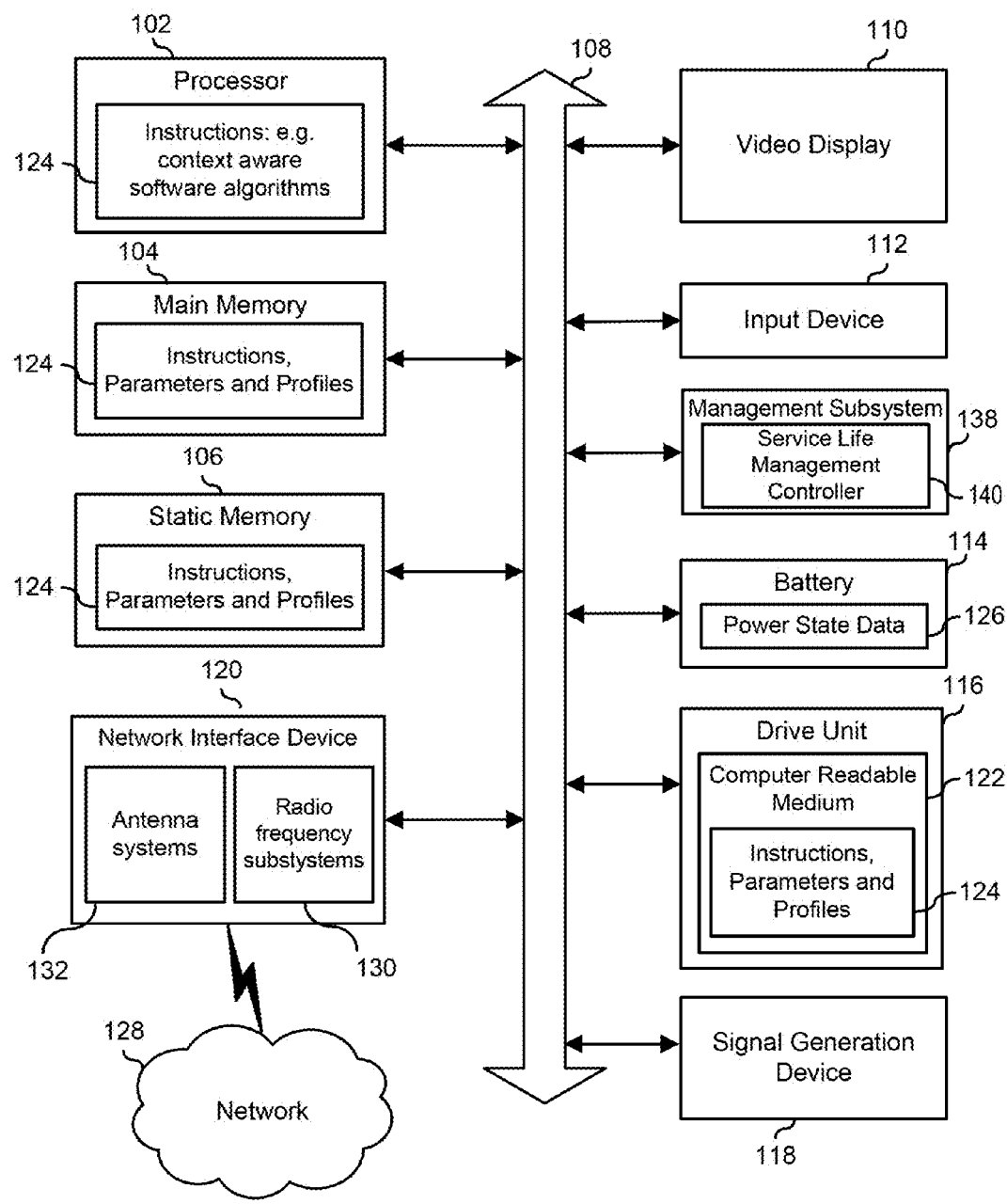
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Computing device technology is subject to continual improvement. Customers typically purchase new or more recent computing device from time to time. A growing number of customers lease computing devices from a lessor, such as a system manufacturer, for a period of time, for example three years or so. These computing devices are refurbished and resold after the lease period is over. Determining a suitable disposition for used computing devices can be problematic, especially as the number of such computing devices can be large. Existing resale processes use very simple metrics, such calendar life (e.g., time from ship date), pass/fail diagnostics testing, and a letter grade based on appearance of the system after the lease period has ended. Such simple metrics can be of questionable accuracy. Failure to account for events and usage prior to resale can lead to underinclusion or overinclusion of computing devices in the group of computing devices to be resold.

Resale of computing devices can benefit from more accurate and granular measurement of customer usage. According to at least one embodiment, a method to track detailed metrics of events and usage during prior use for determining disposition of used computing devices is provided. Resale value and indicators for refurbishment of used computing devices, such as returned leased computing devices can be provided. Determinations for the disposition of used computing devices can be referred to as end-of-life determinations relative to the useful life of the devices for the previous user or owner, such as a lessor.

A central information handling system management data repository, such as a data repository, which may be referred to as a data vault, established by an information handling system vendor to store information handling system management data obtained from information handling systems in operation for customers, can be used for obtaining data from which a service life indication can be determined. The central information handling system management data repository can receive and store data obtained from local instrumentation of a client information handling system. The central information handling system management data repository can be used to implement monitoring and reporting the physical state of a device, extending basic system capabilities to support predictive health reporting and self-remediation, dynamic resource optimization and adaptive behavior. Using a central information handling system management data repository, client information handling systems can be monitored, for example, from the factory even after the systems have been sold and are being used by customers. Key event and usage data can be tracked throughout the life-cycle of the product. Examples of data to be tracked can include the following: detailed device and overall system usage conditions and severity, system and individual device utilization profiles, power parameter values, battery parameter values, system event parameter values, mechanical event parameter values, thermal parameter values, networking parameter values, processor parameter values, memory parameter values, display parameter values, storage parameter values, connector parameter values, and system configuration parameter values. Power parameters can include, for example, power-on hours (including alternating current (AC) power-on hours, battery power-on hours, and the sum of those hours), power cycles, hibernate and sleep state requests, time in sleep states, and duty cycles. Battery parameters can include, for example, relative state of charge (RSOC), charging current, voltage, power, battery cycles, temperature, current drawn, and full charge capacity. System event parameters can include, for example, system thermal events, hardware and operating system (OS) system failure events, motherboard (MB) free fall events, and system-off conditions, such as storage conditions. Mechanical event parameters can include, for example, mechanical cumulative stress counters (accelerometers, free fall, hinge cycles, connector cycles, docking cycles, etc.). Thermal parameters can include, for example, central processing unit (CPU), motherboard, graphics and, memory temperatures, fan revolutions per minute (RPM) parameters, and thermal stress history. Networking parameters can include, for example, percentages of activity for wired and wireless network adapters. CPU and memory parameters can include, for example, memory usage, CPU usage and throttling, and paging activity. Display parameters can include, for example, brightness values and a number of displays. Storage parameters can include, for example, hard disk drive (HDD) parameters such as percentages of time in idle, read, and write states, Self-Monitoring, Analysis, and Reporting Technology (SMART) logs, and HDD free space. HDD parameters can include parameters pertaining to a rotating magnetic or optical disk or to a solid-state memory storage device, such as a flash memory drive. Connector parameters can include, for example, connection status of internal connectors. System configuration parameters can include, for example, a service tag, system type, basic input output system (BIOS) version, hard disk drive (HDD) size and model, battery size, operating system (OS), random access memory (RAM) size, etc. System configuration parameters can include, for example, hardware configuration and changes over time, software/operating system (OS) configuration and changes over time, and historic data on repair and service actions.

The above data and records are used to create models to recommend end-of-life decisions on systems. Decisions can include, for example, resale or recycling. Resale can include, for example, resale of an entire system "as is" or resale of salvage parts obtained from a system. Resale can be performed with or without upgrade of devices included in the system before resale. Resale price and warranty offered can be calculated based on actual wear history and life expectancy. In accordance with at least one embodiment, a method can be provided to determine estimate life expectancy of devices of a system or the system as a whole based on usage data and statistical models to determine end-of-life decisions.

An intelligent service life management system may access system status monitoring data related to a hardware implementation monitoring system that monitors and stores data relating to usage of component devices and systems in client information handling systems. The hardware implementation monitoring system may operate in the background during operation of the information handling system. Component device utilization data may be collected via numerous source information handling systems, and relate to operation of numerous hardware functions of each client information handling system. Component device utilization data may be retrieved from a variety of sensors including detection of events and usage that may contribute to wear of the client information handling system. Power draw measurements may be conducted on power rails supplying power to individual component devices in the client information handling system or to component devices externally connected to the information handling systems. Power draw measurements can be used to estimate power dissipation and thermal conditions at the individual component devices. Additionally processor activity, controller activity, wireless interface activity, memory/drive activity, and other component activity measurements may also be assessed independently or in connection with power draw measurements. Data representative of events detected by sensors, such as an impact detected by an accelerometer, can be collected. Data representative of events can be detected by system-level sensors, located, for example, on a motherboard of an information handling system, and by component-level sensors, located, for example, at a component, such as a hard disk drive (HDD), of the information handling system. Collected data may be sourced via SMBIOS, Win 32 API, or device drivers to a database repository. An example, hardware implementation monitoring database includes the Dell® Data Vault (DDV) system operational via Windows® or other operating systems. Component device utilization data may be collected and stored on-box locally at a client information handling system, or may be reported remotely to a hub server or servers or a remote data center hosting a DDV or other data repository for a plurality of client information handling systems.

Monitoring is done via network connection and a hardware implementation monitoring system and an intelligent service life management system having a disposition policy engine. Policy may be implemented on an individualized basis for specific client information handling systems. In other embodiments, disposition policies may be implemented on an enterprise level via feedback of wear and reliability trends for aspects of information handling systems in the enterprise to enable apportionment of disposition policies. In accordance with at least one embodiment, the selection may not necessarily be optimal with respect to aesthetic appearance of used information handling systems but may instead depend on metrics obtained during prior use of the information handling system and considerations of reutilization priorities. In yet other embodiments, subgroups of enterprise client information handling systems may fall into defined classifications based on many factors, for example disposition index determinations or business factors, and policy applied to classification levels. Appropriate disposition of individual used information handling systems may therefore be more accurately estimated with system-level event monitoring, component-level event monitoring, system-level usage monitoring, component-level usage monitoring, and disposition policy optimized. Additionally, statistical modeling of parameter values that affect disposition determination across a broader set of information handling systems may more accurately yield an appropriate disposition determination for an individual used information handling system. Enterprise wide disposition policies may also be optimized based on a plurality of factors as described herein.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

FIG. 1 shows an information handling system 100 capable of administering each of the specific embodiments of the present disclosure. The information handling system 100 can represent the client information handling systems of FIG. 2 such as 220, 221, 222, and 224 or servers or systems such as 210 located anywhere within network 200, including the remote data center 290 operating virtual machine applications as described herein. The information handling system 100 may also execute code for hardware implementation monitoring and reporting system and for an intelligent service life management system that may operate on servers or systems 210, remote data centers 290, or on-box in individual client information handling systems such as 220, 221, 222, and 224 according to various embodiments herein. In other aspects, intelligent service life management system agents may operate on client information handling systems such as 220, 221, 222, and 224 to log and collect data relating to component device utilization and other use metrics. For example, power draw of various component devices within the client information handling systems 220, 221, 222, and 224 may be measured and logged in a hardware implementation monitoring system data repository such as a Dell® Data Vault by the intelligent service life management agent operating on the client information handling system. In some aspects, this component device utilization data may be reported back to a hub server or remote data center operating the intelligent service life management system in accordance with the disclosure herein. In other aspects, some or all of the intelligent service life management system may operate on-box at the client information handling system to provide disposition suitability indications and other operations.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, and drive unit 116 (volatile (e.g. random-access memory, etc.), nonvolatile (read-only memory, flash memory etc.) or any combination thereof). Additional components of the information handling system can include one or more storage devices such as static memory 106 and drive unit 116. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display unit 110, such as a liquid crystal display (LCD), an organic light emitting diode (OLED), a flat panel display, a solid state display, or a cathode ray tube (CRT). Additionally, the information handling system 100 may include an input device 112, such as a keyboard, and a cursor control device, such as a mouse, touchpad, or gesture or touch screen input. The information handling system 100 can also include a signal generation device 118, such as a speaker or remote control. The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 116, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive 116 or in a storage system (not illustrated) associated with network channel 120 or any combination thereof. Application programs 124 and BIOS/FW code 124 can each be implemented as single programs, or as separate programs carrying out the various features as described herein. Application program interfaces (APIs) such Win 32 API may enable application programs 124 to interact or integrate operations with one another.

In an example of the present disclosure, instructions 124 may execute the intelligent service life management system disclosed herein. Additionally, instructions 124 may execute the hardware implementation monitoring system disclosed herein and an API may enable interaction between these application programs and device drivers and other aspects of the information handling system and software instructions 124 thereon. In a further example, processor 102 may conduct processing of component device power utilization data by the information handling system 100 according to the systems and methods disclosed herein. The computer system 100 may operate as a standalone device or may be connected, such as via a network, to other computer systems or peripheral devices.

Main memory 104 may contain computer-readable medium (not shown), such as RAM in an example embodiment. Static memory 106 may contain computer-readable medium (not shown), such as NOR or NAND flash memory in some example embodiments. The disk drive unit 116 may include a computer-readable medium 122 such as a magnetic disk in an example embodiment. The computer-readable medium of the memory and storage devices 104, 106, and 116 may store one or more sets of instructions 124 such as software code corresponding to the present disclosure.

The disk drive unit 116, and static memory 106, also contains space for data storage such as a hardware implementation monitoring system data. Gathered component device utilization data may also be stored in part or in full in data storage 106 or 116 which may serve as some or all of a component device utilization data repository. Further, the instructions 124 may embody one or more of the methods or logic as described herein. For example, instructions relating to the hardware implementation monitoring system, the intelligent service life management system software algorithms, or the intelligent service life management agent may be stored here.

In a particular embodiment, the instructions, parameters, and profiles 124 may reside completely, or at least partially, within the main memory 104, the static memory 106, disk drive 116 and/or within the processor 102 during execution by the information handling system 100. Additionally, service life policy settings, and wear estimation profiles and other aspects relating to the intelligent service life management system functions may be stored in disk drive 116 or static memory 106. Wear estimation profiles may be statistical models of system wear, individual component device wear, resale value estimations, and wear index determinations performed by an intelligent service life management system in some embodiments. Parameters may include aspects of component data utilization data to be analyzed with the intelligent service life management system. Service life policy requirements may be set by an administrator such as an IT department of an enterprise or be automatically triggered based on wear estimations and productivity determinations. Component device utilization data in storage may also include data such as component device utilization data measured by the processor 102 for specific component devices or systems during information handling system operation. In some aspects, intelligent service life management system parameters may include business factor determinations of enterprise critical applications or high importance information handling systems which may impact wear index determinations or service life policy implementations. Such profile business factors may govern parameters and policy around wear estimations. As examples, a lower level of wear may be tolerable for high importance information handling systems, while a higher level of wear may be tolerable for lower importance information handling systems.

The information handling system may include a power source such as battery 114 or an A/C power source. Battery 114 may include a smart battery system that tracks and provides power state data 126. This power state data 126 may be stored with the instructions, parameters, and profiles 124 such as component device utilization data to be used with the systems and methods disclosed herein.

The information handling system may also have a management subsystem 138 with a plurality of information handling system subsystems for control of a plurality of systems. For example, data relative to the service life of the information handling system may be collected or managed by a service life management controller 140 such as service life management unit that may access other elements shown in FIG. 1, for example, via one or more buses 108. In some aspects, system-level events, component-level events, system-level usage data, and component-level usage data can be collected and managed via the service life management control system 140. In other aspects, event and usage data may also be monitored with respect to component devices of the information handling system. In some aspects where applicable, execution of disposition policy may be administered partially via the service life management control system 140.

The information handling system 100 can also include a network interface device 120 that may be wired network adapter or may be a wireless adapter as shown. Wireless network interface devices will include antenna subsystems 132 and radio frequency control subsystems 130 which may work in connection with the management subsystem 138. As a wireless adapter, network interface device 120 can provide connectivity to a network 128. A wired network interface is also contemplated (not shown). Radio frequency subsystems 130 and antenna subsystems 132 may include transmitter/receiver circuitry, wireless controller circuitry, amplifiers and other circuitry for wireless communications. Each radiofrequency subsystem 130 may communicate with one or more wireless technology protocols.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
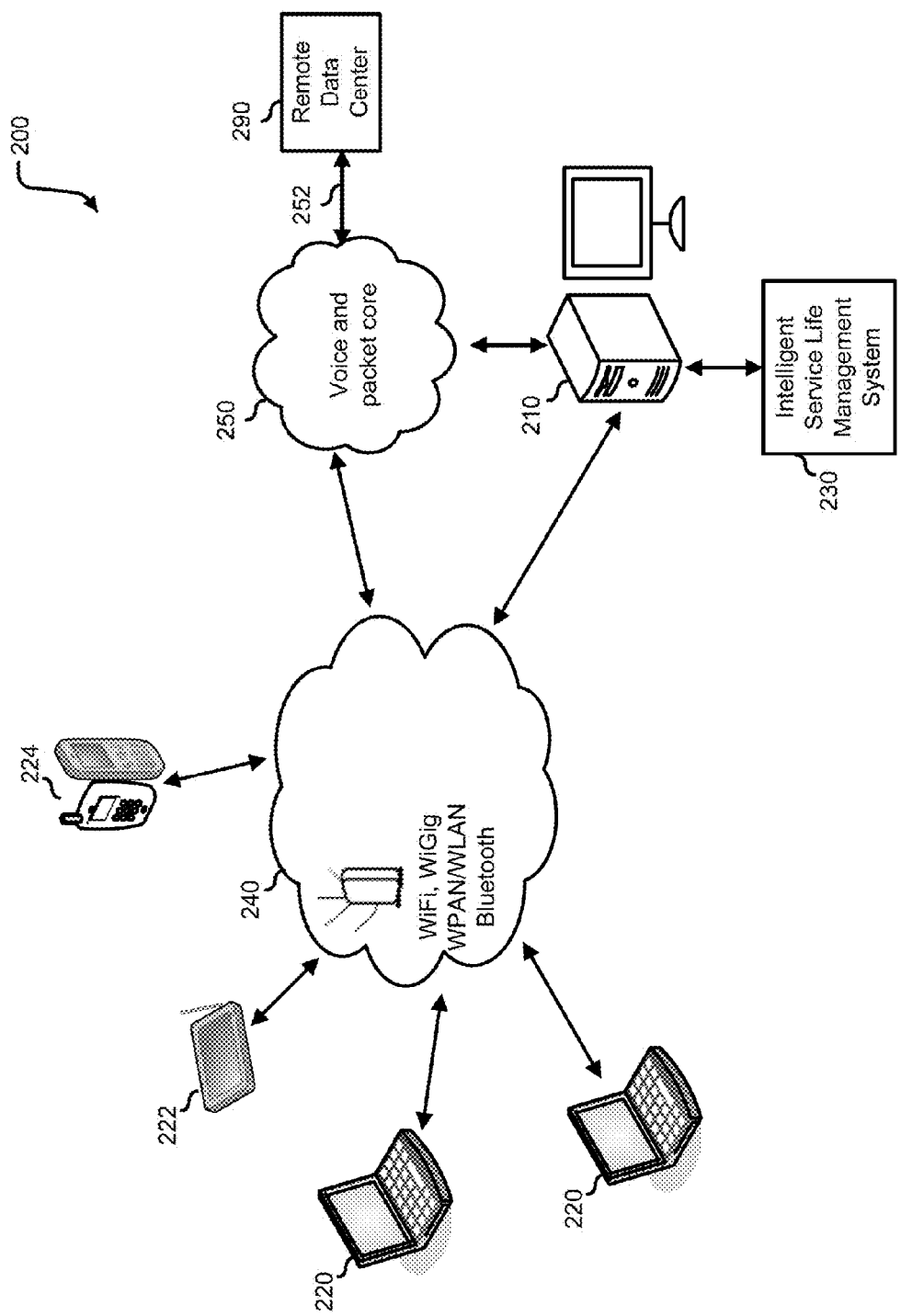
FIG. 2 is a block diagram illustrating a network environment having a plurality of information handling systems according to an embodiment of the present disclosure.

FIG. 2 illustrates a network 200 that can include one or more information handling systems. In a particular embodiment, network 200 includes networked information handling systems 210, 220, 221, 222, and 224, wireless network access points, routers and switches, and multiple wireless connection link options. Systems 210, 220, 221, 222, and 224 represent a variety of computing resources of network 200 including client mobile information handling systems, data processing servers, network storage devices, local and wide area networks, or other resources as needed or desired. In some embodiments, some or all of network 200 may be under control of IT management for a group or enterprise. As specifically depicted, systems 220, 221, 222, and 224 may be a laptop computer, tablet computer, or smartphone device in certain aspects. These user mobile information handling systems 220, 221, 222, and 224, may access a wireless local area network 240, or they may access a macro-cellular network. For example, the wireless local area network 240 may be the wireless local area network (WLAN), a wireless personal area network (WPAN), or a wireless wide area network (WWAN). Since WPAN or Wi-Fi Direct Connection and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local area network 240 may be via standard protocols such as IEEE 802.11 Wi-Fi, IEEE 802.11ad WiGig, IEEE 802.15 WPAN or similar wireless network protocols. Alternatively, other available wireless links within network 200 may include macro-cellular connections. Macro-cellular connections may include 2G standards such as GSM, 2.5G standards such as GSM EDGE and GPRS, 3G standards such as W-CDMA/UMTS and CDMA 2000, or 4G standards such as WiMAX, LTE, and LTE Advanced.

The voice and packet core network 250 may contain externally accessible computing resources and connect to a remote data center 290. The voice and packet core network 250 may contain multiple intermediate web servers or other locations with accessible data (not shown). Connection between the wireless network 240 and remote data center 290 may be via Ethernet or another similar connection to the world-wide-web, a WAN, a LAN, another WLAN, or other network structure. Such a connection via WLAN access point/Ethernet switch to the external network may be a backhaul connection. The wireless access point may be connected to one or more wireless access points in the WLAN before connecting directly to a mobile information handling system or may connect directly to one or more information handling systems 210, 220, 221, 222, and 224.

Remote data center 290 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the client mobile information handling systems 220, 221, 222, and 224 allowing streamlining and efficiency within those devices. Similarly, remote data center 290 permits fewer resources to be maintained in other parts of network 200.

In an example embodiment, the cloud or remote data center 290 may run hosted applications for systems 210, 220, 221, 222, and 224. This may occur by establishing a virtual machine application executing software to manage applications hosted at the remote data center 290. Mobile information handling systems 220, 221, 222, and 224 are adapted to run one or more applications locally, and to have hosted applications run in association with the local applications at remote data center 290 or applications running on another remote information handling systems such as 210. The virtual machine application may serve one or more applications to each of the network connected information handling systems including 210 and client information handling systems 220, 221, 222, and 224. Thus, as illustrated, systems 220, 221, 222, and 224 may be running applications locally while requesting data objects or submitting data objects related to those applications from or to the remote data center 290 and host information handling system 210 via the wireless network. Similarly, system 210 may be running applications locally while requesting data objects or submitting data objects related to those applications from or to the remote data center 290 and receiving or submitting data objects to client information handling systems 220, 221, 222, and 224 via wireless network 240 or voice and packet core 250. For example, a Dell® Data Vault hardware implementation monitoring and reporting application may run locally at systems 220, 221, 222, and 224 and report data back to a host server system 210. In an embodiment, data may then be stored locally, at host system 210, or at a remote data center 290 relating to system status for client information handling systems 220, 221, 222, and 224.

Figure 3:
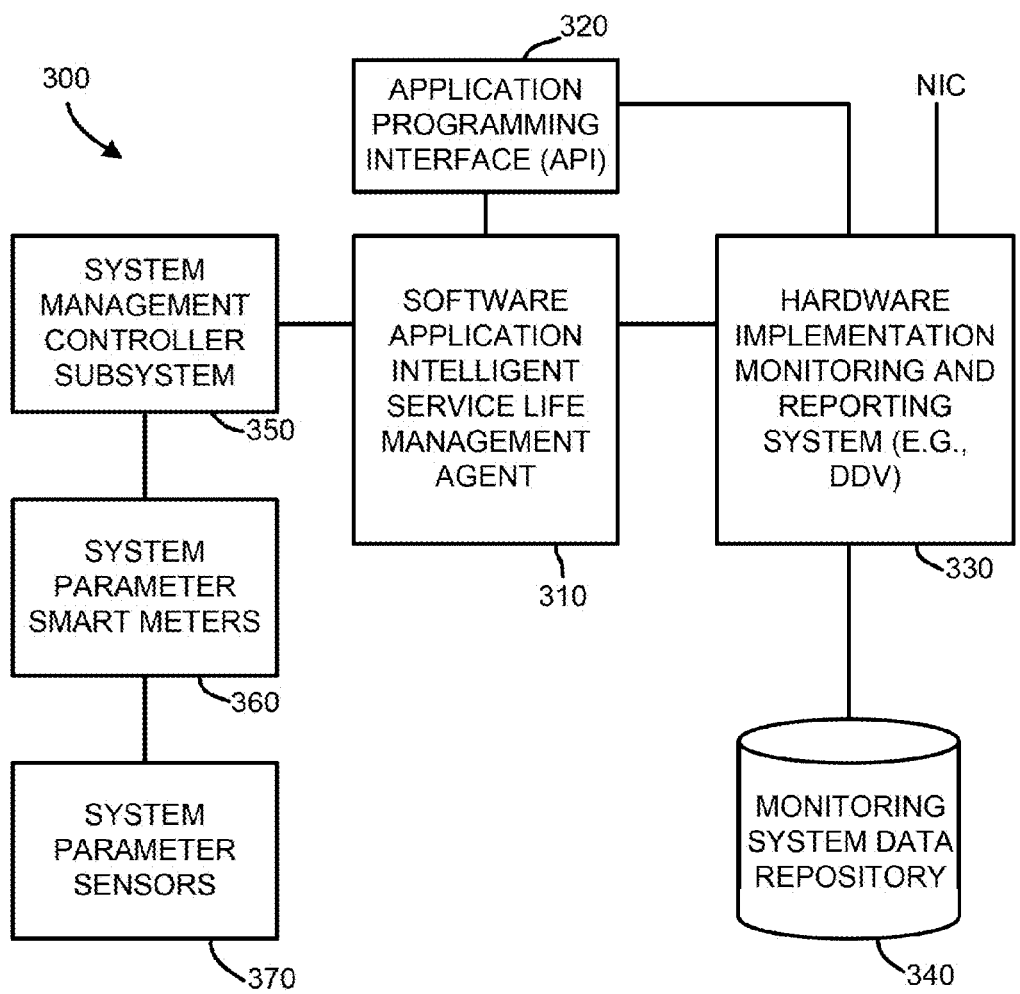
FIG. 3 is a block diagram illustrating components for an aspect of an intelligent system service life management system according to an embodiment of the present disclosure.

FIG. 3 is a block diagram illustrating components for an aspect of an intelligent system service life management system according to an embodiment of the present disclosure. The client information handling system of FIG. 3 may execute code to operate an intelligent service life management system agent 310 that coordinates collection of event and usage data that can include system-level event data, component-level event data, system-level usage data, and component-level usage data, in a client information handling system.

The intelligent service life management system agent 310 may coordinate with a system management controller sub-system 350 to collect component device utilization data for the client information handling system. A system management controller sub-system 350 may include connection to a plurality of system parameter smart meters 360 situated to detect system parameter values from a plurality system parameter sensors 370 of component devices and systems in the client information handling system in some embodiments. According to one aspect, smart meters 360 may detect power on supply rails to components such as the CPU, GPU, or the full chipset. Additional component devices including displays, various controllers, both wired and wireless network interface systems, memory, and disk storage systems may have smart meters 360 based on sensors 370 situated to detect system parameter values relevant to wear of component devices or similar component devices in the client information handling system.

Peripherals among other remotely connected component devices may have intelligent smart meters 360 to report data from system parameter sensors 370 of those information handling system components. In some embodiments, system parameter sensors 370 may be used to identify and measure events and usage relevant to wear within the information handling system. In an aspect, smart meters 360 may monitor system parameter values from the client information handling systems however through peripheral connectors such as USB or similar connections. If this system parameter value measurement for peripherals is not specific to one peripheral, the peripheral component performance levels may be used to provide estimates. Such estimation may be also used for component device system parameter measurements within client information handling systems that may not be outfitted with a complete array of smart meters for component devices in other aspects of the disclosure.

A hardware implementation monitoring and reporting system 330 may monitor performance levels and activity levels of the various component devices or systems of a client information handling system. Such a system will monitor and collect operational activity data and may even include system parameter event occurrences and usage measurements. System parameter measurement may be coordinated between the hardware implementation monitoring system 330 and the intelligent service life management system 310. For operational activity data collected as part of component device utilization data, data points collected may depend on the component device or system being monitored. For example, a processor or controller such as a CPU, utilization factors such as throughput, latency, availability, service times, throttle, ACPI processor states, thread number, processor queue length or other processing performance or utilization measurements may be taken. In some embodiments, system parameter measurement may take place via the system management controller subsystem 350 of a client information handling system. Activity of each of the plurality of component devices is monitored by the hardware implementation monitoring system 330, for example a Dell® Data Vault system. With this information, usage of component devices may be determined by the intelligent service life management system agent 310 according to detected activity of the variety of component devices and systems. This usage determination may assess factors including measurements for those component devices.

The intelligent service life management system 310 may comprise a set of instructions run on CPU or embedded controller in the chipset(s). The intelligent service life management system 310 interfaces with the application programming interface (API) 320 found in the information handling system software to coordinate various software applications including the hardware implementation monitoring and reporting system 330 and monitoring system data repository 340 for storing component device utilization data. The API 320 may further coordinate the intelligent service life management system application agent 310, the monitoring and reporting system 330, system parameter smart meters 360, system parameter sensors 370, device drivers of various component devices, and other system performance sensors linked with the hardware implementation monitoring system. The API 320 may also coordinate with the system management controller sub-system 350 and also other system management controllers in various embodiments. These aspects work together to monitor system events, component events, system usage, component usage, and other component device utilization measurements in the one or more client information handling systems of a group or enterprise. Component usage and other usage measurements comprise part of the component device utilization data that is reported back to a centralized intelligent service life management system. In some aspects, the centralized intelligent service life management system may coordinate event and usage data across an enterprise or other group of information handling system users. For example, the hardware implementation monitoring and reporting system 330 may report component device utilization data via a network interface (NIC) as shown. The reporting may be ongoing, periodic, or in response to requests for data from the intelligent service life management system operating remotely at a hub server or remote data center. Any method of data reporting to a centralized intelligent service life management system is contemplated. The component device utilization data recorded for client information handling systems is also granular in that it may be broken down by component devices within the client information handling systems. Component device utilization data may also be coordinated with operational measurements to identify trends in operation and habits of users and client information handling systems as discussed further herein. Other data may be recorded as well. This may include time/date data, global positioning system information, usage of AC power sources versus battery usage, and the like. This data may also be included in component device utilization data as well as identifying information relating to the client information handling systems that are part of the enterprise or group.

In some embodiments, an intelligent service life management system may also operate on-box in one or more client information handling systems. In such an embodiment, the monitoring system data repository 340 having component device utilization data may be utilized by the on-box centralized intelligent service life management agent 310 to prepare event and usage data specific to the client information handling system. In such cases, data from other client information handling systems, such as a similarly situated class of information handling systems, may be received by the client information handling system hosting an on-box intelligent service life management system to assist in analysis.

The hardware implementation monitoring and reporting system 330 may receive data from a plurality of sensor systems. Sensors can include software and hardware detection mechanisms known in the art to determine performance levels or operation activity of the component devices. It may include additional sensors such as orientation sensors, temperature sensors, data throughput or processing detection systems, and other component device performance detection systems. Orientation sensors, for example, may include one or more digital gyroscopes, accelerometers, and magnetometers in example aspects. As another example aspect, temperature sensors may include thermistors or other temperature sensing systems. Sensor system data may be accumulated at an accumulator sensor hub.

Figure 4:
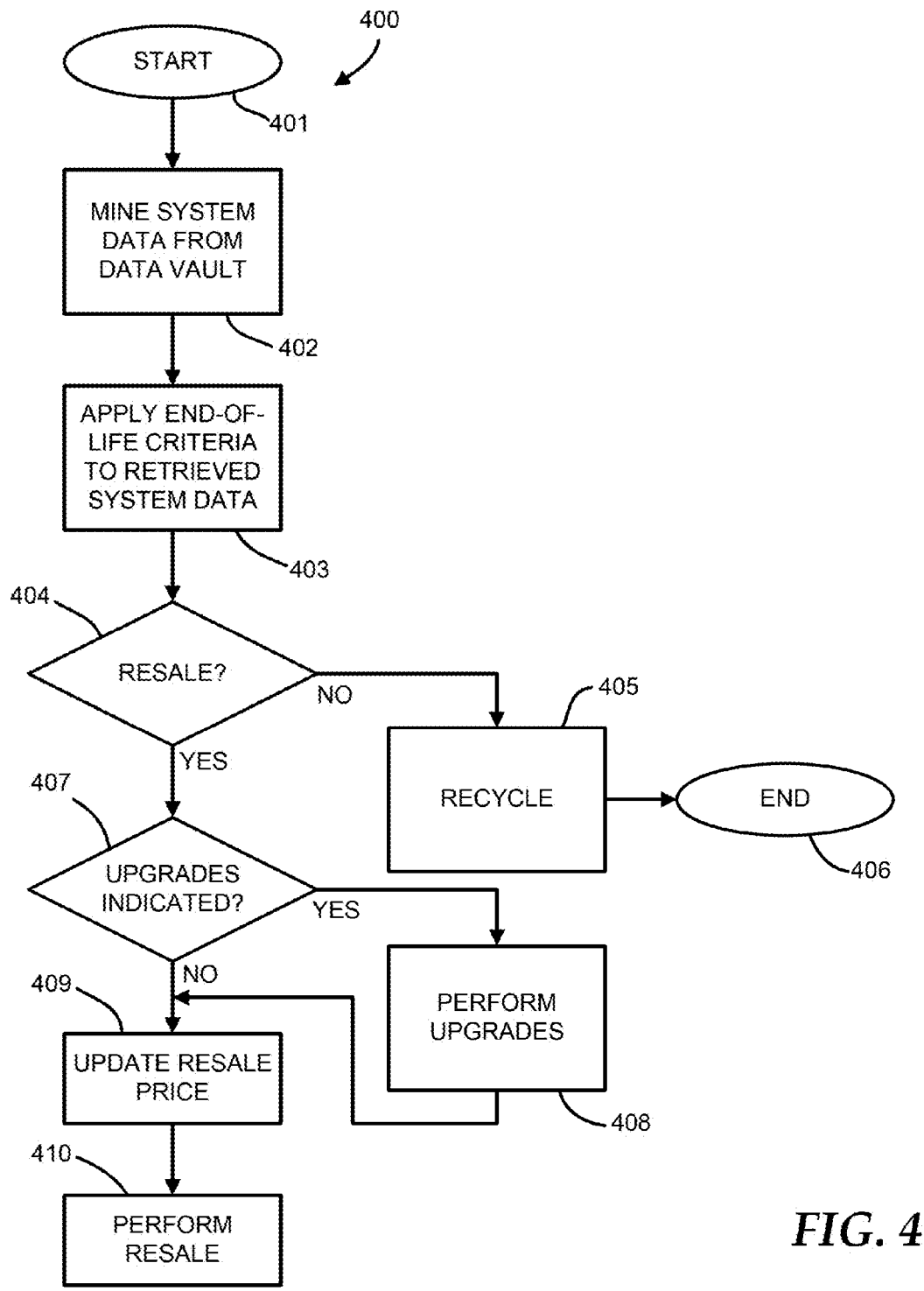
FIG. 4 is a flow diagram illustrating a method of information handling system service life management according to an embodiment of the present disclosure.

FIG. 4 is a flow diagram illustrating a method a method of information handling system service life management according to an embodiment of the present disclosure. Method 400 begins in block 401 and continues to block 402. In block 402, system data is mined from a data vault. As an example, the data vault may be a central data vault storing system data from a plurality of client information handling systems. For example, the central data vault may be central data vault established by a client information handling system vendor to store system data obtained from client information handling systems obtained from the vendor when those client information handling systems are operating for customers of the vendor. As another example, the data vault may be a local data vault storing system data from a client information handling system. From block 402, method 400 continues to block 403. In block 403, end-of-life criteria are applied to retrieved system data. As noted, retrieved system data can include, for example, key event and usage data such as detailed device and overall system usage conditions and severity, system and individual device utilization profiles, power parameter values, battery parameter values, system event parameter values, mechanical event parameter values, thermal parameter values, networking parameter values, processor parameter values, memory parameter values, display parameter values, storage parameter values, connector parameter values, and system configuration parameter values, for all of which examples are described herein. End-of-life criteria are established with respect to retrieved system data elements or subsets thereof. As an example, end-of-life criteria can be threshold values against which one or more of the above parameter values are compared. As another example, end-of-life criteria can be incorporated into a mathematical relationship dependent upon multiple retrieved system data elements. For example, statistical model of wear estimation can establish end-of-life criteria. A statistical model of wear estimation can be based, for example, on a probability mass function (PMF) of system or component failure likelihood based on historical results or expected results of individual or combined client information handling system wear parameter values. From block 403, method 400 continues to decision block 404. In decision block 404, a decision is made as to whether or not the information handling system is suitable for resale. The retrieved system data described above can be used as a basis of the decision of decision block 404. For example, if one or more parameter values are correlated with high likelihood of low reliability of an information handling system, the decision may be made that the information handling system is not suitable for resale. As an example, a statistical model of wear estimation can be used to evaluate the one or more parameter values and to establish such a correlation. If at decision block 404, the decision is made that the information handling system is not suitable for resale, method 400 continues to block 405. In block 405, an indication to perform recycling of the information handling system is provided. As an example, the indication can be an indication to scrap the information handling system as a whole. As another example, the indication can be an indication to recover one or more reusable components of the information handling system and to scrap other non-reusable components of the information handling system. From block 405, method 400 continues to block 406. In block 406, method 400 ends.

If, at decision block 404, the decision is made that the information handling system is suitable for resale, method 400 continues to decision block 407. In decision block 407, a decision is made as to whether or not the information handling system is to be upgraded before resale. If so, method 400 continues to block 408, where an indication to perform the upgrades is provided. Examples of upgrades for which an indication can be provided include main processor upgrades, memory upgrades, graphics processor upgrades, data storage component upgrades, network adapter upgrades, and the like. From block 408, method 400 continues to block 409. If, in decision block 407, a decision was made that the information handling system is not to be upgraded before resale, method 400 continues to block 409. In block 409, an updated resale price is calculated, wherein the updated resale price reflects any upgrades performed in block 408. From block 409, method 400 continues to block 410. In block 410, an indication to perform resale of the information handling system is provided. One or more client information handling systems may operate an intelligent service life management system agent to collect event and usage data and other data. The component device utilization data may be reported via a hardware implementation monitoring and reporting system on the client information handling system. As described, this data may be reported back to an intelligent service life management system collecting component device utilization data for client systems across an enterprise or other group of client information handling systems.

Figure 5:
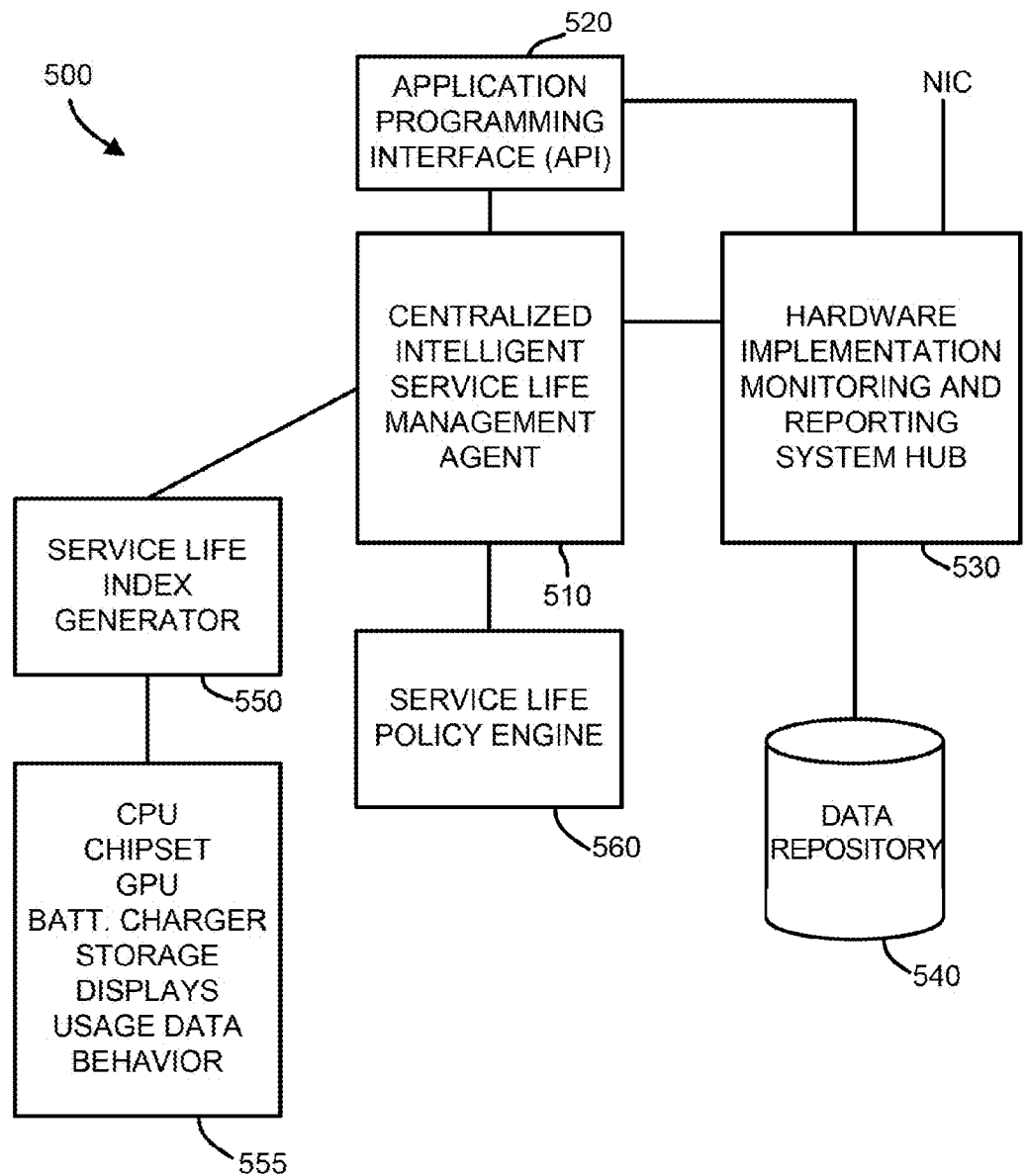
FIG. 5 is a block diagram illustrating components for another aspect of an intelligent service life management system according to an embodiment of the present disclosure.

FIG. 5 is a block diagram illustrating components for another aspect of an intelligent service life management system 510 and a hardware implementation monitoring and reporting system hub 530 according to an embodiment of the present disclosure. The intelligent service life management system 510 and a hardware implementation monitoring and reporting system 530 may be hosted on a central server or at one or more remote data centers or some combination. In other embodiments, the intelligent service life management system 510 and a hardware implementation monitoring and reporting system 530 may operate from one or more client information handling systems. The intelligent service life management system 510 and hardware implementation monitoring and reporting system 530 may be deployed by an enterprise IT department to monitor event and usage data across the enterprise by client information handling systems supported by the enterprise. It is understood that the disclosure herein is not limited to an enterprise and may be applied to any group of supported information handling systems whereby the intelligent service life management system 510 is used to monitor event and usage data and predict wear estimates. The intelligent service life management system 510 may also be used to generate or establish service life policies based on wear estimation and other factors including enterprise critical system or user functions with the client information handling systems. In certain embodiments, the intelligent service life management system 510 and hardware implementation monitoring and reporting system 530 may operate on-box on an individual client information handling system instead of as a centralized system to determine predicted wear of that client system and establish service life policies. Such a localized intelligent service life management system 510 may nonetheless coordinate and report to a centralized intelligent service life management system in some embodiments.

Some or all of hardware implementation monitoring system data repository may also be stored at an enterprise server, at one or more remote data centers, or at some combination. The server information handling system executes code to operate the intelligent service life management system 510. As a host to a network of enterprise client information handling systems, the intelligent service life management system 510 and hardware implementation monitoring and reporting system 530 coordinate collection of component device utilization data from a plurality of client information handling systems supported by the enterprise (or other grouping). As described above, the component device utilization data can include power draw data, including power cycle data, for component devices of the client information handling systems as well as other data.

The intelligent service life management system 510 may comprise a set of instructions run on CPU or embedded controller in the chipset(s) of one or more host devices. The intelligent service life management system 510 interfaces with the application programming interface (API) 520 found in the host information handling system software to coordinate various software applications including the hardware implementation monitoring and reporting system hub software code 530 and accesses to monitoring system data repository 540 for component device utilization data. The API 520 may coordinate the intelligent service life management system application 510 and the monitoring and reporting system 530 to conduct wear estimation across the client information handling systems supported by the group or enterprise.

The monitoring system data repository 540 may store event and usage data and other component device utilization data such as identification data for supported client information handling systems. Additional data that may be stored at the monitoring system data repository 540 may include GPS data and timing or calendar data for supported client information handling systems. The intelligent service life management system 510 may access the component device utilization data from a plurality of client information handling systems to determine wear estimates across the enterprise. A service life policy engine 560 coupled to intelligent service life management system 510 may be used to implement a service life policy.

A service life index generator 550 is a sub-part of the intelligent service life management system 510 in some aspects. The service life index generator 550 may operate to determine or rank event or usage levels of individual client information handling systems supported within the enterprise or group. Such determination or ranking can include, for example, applying a ranking system across an enterprise or across a group, which may be larger than an enterprise, for example, at an aggregate level across multiple enterprises having similar expectations for client information handling system reliability, longevity, and other criteria relevant to service life. As examples, rankings can be done across the client information handling systems of all customers and by specific industries or industry segments of customers. As a more specific example, a median ranking service life index in the health care industry could be determined to justify a higher resale price than a median ranking service life index in another industry where more exposure of client information handling systems to factors resulting in wear may occur. Wear assessment by the service life index generator 550 may assess event occurrences and usage levels of component devices 555 within client information handling systems. Examples of such component devices 555 include a CPU/chipset, memory, GPU, disk/flash storage, battery charger, displays, network usage, other usage and behavior, or assessment of applications hosted by the client system when determining a wear ranking for the client information handling system. Service life index rankings may be applied to classify plurality of similarly-situated client information handling systems by estimated wear class within the enterprise as well. Business factors may also affect wear rankings or classifications. For example, client information handling systems service life may be affected by tasks regularly performed on them by users. Those tasks may be high priority activity to the enterprise or group. In other examples, the users assigned to certain supported client information handling systems may have a high ranking importance within the enterprise for which low wear estimates may take a priority. These business factors may affect wear classifications for some client information handling systems. For example, service life index rankings of client information handling systems may be affected by the user of the client system. In an aspect, the executive levels of users may factor into the service life index. These enterprise business factors may impact the determination of service life index calculations for client information handling systems.

In some embodiments, the service life index assessment may even be made at the level of component device service life within client information handling systems. In these examples, a service life index may be assessed for particular component devices and systems. As a result, event occurrence, usage measurement, and wear estimation for those component devices may be assessed and service life policy tailored according to component device wear estimations. Thus, wear assessments may be made for client information handling systems that typically perform tasks involving certain component devices or sub-groupings of devices. For example, the tasks performed by users of the client information handling system may emphasize certain component devices over others. Those component devices may receive higher or lower service life indices as a result which may later factor into service life policy determinations. It is understood that higher service life indices would correspond to higher service life rating for a client information handling system or a component device. However, it is understood that an index system could be used whereby a lower index value corresponds to a greater rating of service life as well in other aspects.

Wear estimates may be established by the intelligent service life management system 510 with access to historic component device utilization data stored in monitoring system data repository 540. In an aspect, the component device utilization data from monitoring system data repository 540 is data collected over a period of time from the client information handling system being assessed to discern trends of usage. In other embodiments, the intelligent service life management system 510 may assess data from a subset of similarly situated client information handling system to discern trends in event occurrence and component system utilization. In yet other embodiments, the intelligent service life management system 510 may access component device utilization data for all available client information handling systems to compare or contrast utilization and determine estimated wear within portions of the enterprise.

Wear estimates may be conducted differently for the variety of component devices of each client information handling system or of a class of client information handling systems in certain embodiments. The intelligent service life management system may assess this service life index and wear estimation based on event and usage history stored with component device utilization data in the monitoring and reporting system and monitoring system data repository. In some embodiments, this determination of wear estimates and service life indices may impact system usage policies established by a service life policy engine for the enterprise IT department.

In other embodiments, an intelligent service life management system may also operate on-box on a client information handling system. The intelligent service life management system 510 may coordinate with a system management controller sub-system to collect component device utilization data for the client information handling system for wear estimation on-box. In such an on-box embodiment, the monitoring system data repository 540 having component device utilization data may be utilized by the on-box intelligent service life management system to prepare wear estimates specific to the client information handling system. The on-box component device event and utilization data and wear estimations for the client information handling system may be networked with a hub host system to share on-box wear estimations across an enterprise in some example embodiments. In such cases, data from other client information handling systems, such as a similarly situated class of information handling systems, may be received by the host information handling system hosting an intelligent service life management system 510. It is understood that the host information handling system of the intelligent service life management system 510 may be a host server, remote data center, or another client information handling system in various embodiments.

Figure 6:
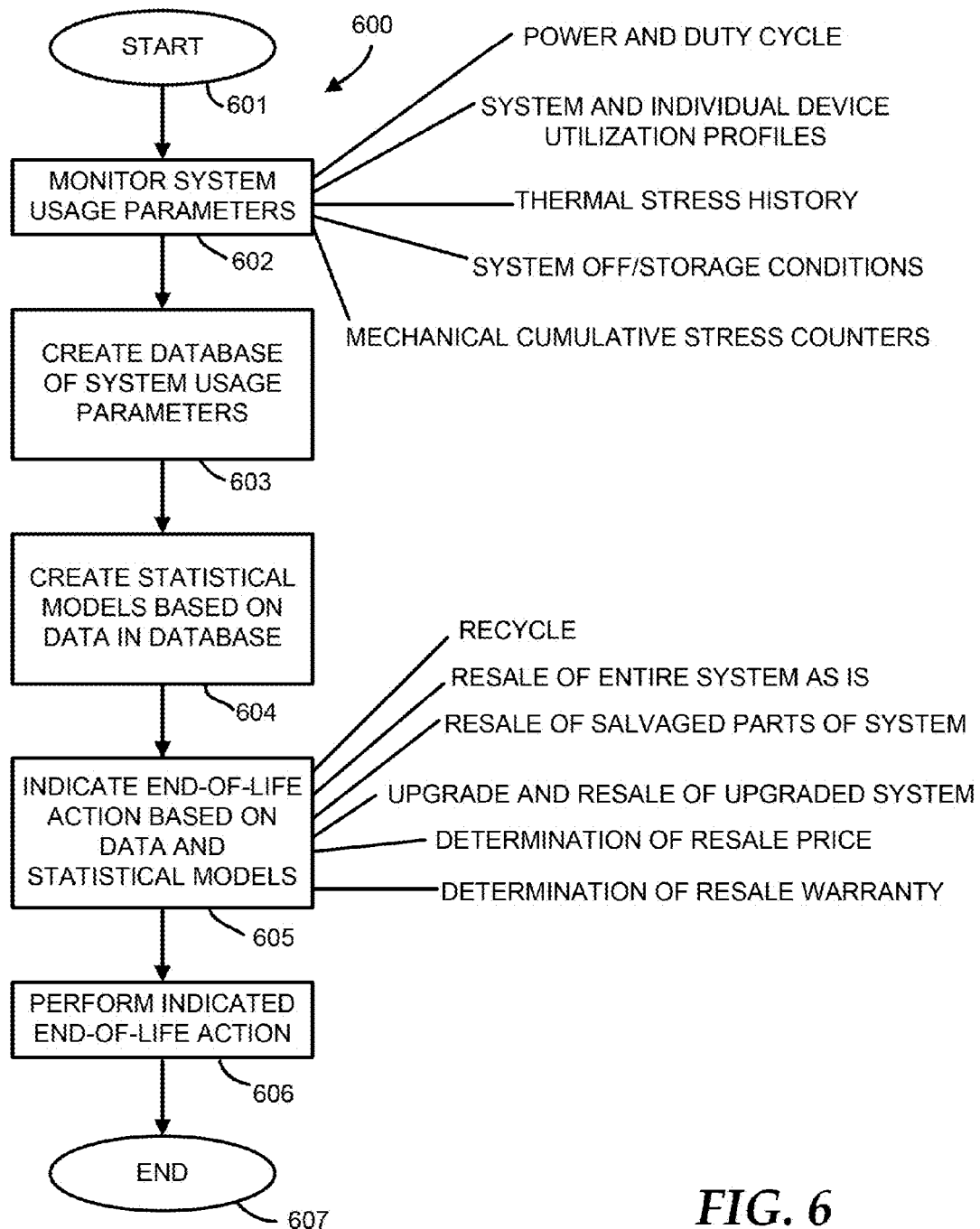
FIG. 6 is a flow diagram illustrating a method of information handling system end-of-life action indication determination according to an embodiment of the present disclosure.

FIG. 6 is a flow diagram illustrating a method 600 of information handling system end-of-life action indication determination for one or more client information handling systems from data received from across a plurality of client information handling systems associated with a group or enterprise according to an embodiment of the present disclosure. Method 600 begins at block 601. From block 601, method 601 continues to block 602. In block 602, system usage parameters are monitored. Examples of the system usage parameters include power and duty cycle, system and individual device utilization profiles, thermal stress history, system off/storage conditions, and mechanical cumulative stress counters. From block 602, method 600 continues to block 603. In block 603, a database of system usage parameters is created. From block 603, method 600 continues to block 604. In block 604, statistical models are created based on data in a database. From block 604, method 600 continues to block 605. In block 605, an indication for an end-of-life action is provided based on the data and statistical models. Examples of possible end-of-life actions include recycling, resale of an entire information handling system as-is, resale of salvaged parts of the information handling system, upgrading and resale of an upgraded information handling system, determination of a resale price, and determination of a resale warranty. From block 605, method 600 continues to block 606. In block 606, the indicated end-of-life action is performed. From block 606, method 600 continues to block 607. In block 607, method 600 ends.

In accordance with at least one embodiment, a host system may initiate the intelligent service life management system code on the host device or remote data server if not already initiated. The host device or remote data servers may serve as a centralized intelligent service life management system in an embodiment.

In accordance with at least one embodiment, the intelligent service life management system monitors event occurrences and usage measurements for client information handling systems associated with a group or enterprise. As and example, intelligent service life management system agent software located on one or more client information handling systems of the enterprise may take measurement of component device utilization data. This component device utilization data may include event and usage data for component devices or systems in each monitored client information handling system. Some portion of the client information handling systems associated with an enterprise or group may be monitored in some embodiments. In other embodiments, all client information handling systems associated with a group or enterprise may be monitored.

In accordance with at least one embodiment, the intelligent service life management system may initiate a request for component device utilization data from one or more monitored client information handling systems. If a request for data has not been issued, client information handling systems continue to be monitored by the intelligent service life management system agents and the hardware implementation monitoring and reporting systems embedded thereon. If a request is issued, component device utilization data is retrieved from one or more client information handling systems. In other embodiments, it is understood that the intelligent service life management system agent and hardware implementation monitoring and reporting system may report component device utilization data to a monitoring system data repository at any time from a monitored client information handling system in various embodiments. For example, the intelligent service life management system agent may report component device utilization data to the intelligent service life management system including by its own initiation, periodic reporting, reporting triggered by an event or threshold such as detection of new data, or any combination. Thus, in some embodiments, issuance of a request for component device utilization data may not be necessary. The flow may proceed to block 620 upon receipt of component device utilization data. Security measures including encryption and security verification may be deployed in the course of communications of reported component device utilization data.

In accordance with at least one embodiment, data from monitored client information handling systems is stored in a monitoring system data repository as described above. As an example, the intelligent service life management system code will access current component device utilization data stored in the monitoring system data repository. Accessed data may include component device event and usage data as well as other component device utilization data.

In accordance with at least one embodiment, intelligent service life management system will determine what wear estimation parameters will be used in wear estimation. The wear estimation parameters may determine the bounds or view of wear estimation desired by the IT manager or other users of the intelligent service life management system. The component device utilization data collected by the intelligent service life management system is complete enough to provide a high degree of confidence in wear estimations. Furthermore, the completeness of the data gathered by the intelligent service life management system permits a wide set of optional parameters to be applied to view specific aspects wear estimation.

Wear estimation parameters may include application of determined service life indices of client information handling systems associated with the enterprise or group. The service life indices of the client information handling systems may be determined in accordance with disclosures herein and may include analysis of component device utilization data to track trends in activity of component devices or systems. Determination of service life indices may also be subject to wear estimation parameter settings set by an enterprise or group IT administrator or other user. Service life indices may be used to classify groups of client information handling systems and those classifications may serve as wear estimation parameters in example embodiments. Other wear estimation parameters determined can include periods of time or use, days of usage, physical locations, selection of particular component devices for analysis, and utilization rates to estimate wear, among other parameters as may be understood can be applied to wear estimation of the present disclosure.

In accordance with at least one embodiment, the intelligent service life management system will determine a disposition of a client information handling system, wherein an application processor determines a statistical model of wear estimation for a plurality of other client information handling systems. The statistical model of wear estimation can be constructed, for example, from client information handling system wear parameter values representative of wear of one or more client information handling systems. As an example, sensors can detect events and usage that can cause wear of an information handling system. Examples include a power switch and its on and off positions, a fan control and its modes of powering a fan or leaving the fan unpowered, thermal sensors to detect thermal conditions within the information handling system, a system accelerometer to detect system-level freefall events and motion of the system as a whole, component accelerometers to detect component-level freefall events and motion of respective components, storage components and wear indications such as SMART HDD diagnostics and flash memory wear indications, a battery charger and its indications of battery wear, and a hinge operation sensor to detect mechanical wear from operation of a hinge of an information handling system. The statistical model of wear estimation can be based, for example, on a probability mass function (PMF) of system or component failure likelihood based on historical results or expected results of individual or combined client information handling system wear parameter values. The information handling system wear parameter values can comprise, for example, motherboard event wear parameter values, component event wear parameter values, and usage wear parameter values. The client information handling system wear parameter values can be stored, for example, in a memory device. The information handling system wear parameter values and the statistical model of wear estimation can be used, for example, to calculate client information handling system wear. A service life indication can be provided for the client information handling system, the service life indication indicative of a disposition suitability.

In accordance with at least one embodiment, intelligent service life management system will utilize time specific data from the component device utilization data for individual client information handling systems to determine time-based trends of utilization across the enterprise. This data may be specific to days of the week or to overall daily utilization trends. Also, the time-based trends may be applied to all measured client information handling systems or may be broken down by class of client information handling system within the group or enterprise in some embodiments. In other embodiments, the time-based trends may also reflect utilization trends for specific device components or categories of device components within the enterprise client information handling systems. Time-based trends may also include time-series wear estimation data useful to generate statistical models or to calculate future wear within parts or all of an enterprise.

In accordance with at least one embodiment, the intelligent service life management system will determine a statistical model for future wear across the group or enterprise based on the historical trends of events and usage affecting wear. The statistical model may also be time-based and specifically reflect expected daily trends or trends expected for given days of the week. Seasonal trends may also play a factor. In some embodiments, the statistical model of events and usage affecting wear across the enterprise may be broken down by service life index class of client information handling system within the group or enterprise in some embodiments. In some embodiments, statistical models of events and usage data affecting wear may be made for specific component devices or categories of device components within the enterprise client information handling systems to allow IT professionals to review trends in event occurrence and device utilization specific to aspects of operation of the client information handling systems at a device component or system level. The estimates of demand may take into account various factors to adjust the wear estimation. For example, battery usage by client information handling systems will shift power consumption levels to a time of when battery charging is conducted with A/C power. In another example adjustment, client information handling system GPS data may be used to discern that a user may be travelling, or working from home. GPS data for client information handling systems will also allow wear estimation to be determined according to locations such as enterprise-owned buildings or campuses. Such trends of travel/work from home may be modeled as well for a portion of the client information handling systems to adjust the modeled estimates of wear of client information handling systems in an enterprise.

Time-based statistical models that track statistical confidences for time-based trend data may also permit IT managers to identify spikes in estimated wear based on historical event and usage data affecting wear in component device utilization data. Identification of future spikes in wear, such as peak need timeframes, allows an enterprise to prepare for or predict those timeframes and set in motion policies to mitigate wear during those peak need timeframes. With the intelligent service life management system, wear estimate calculations carry an improved degree of statistical confidence and may be tailored to specific client information handling systems or their component devices.

Because the device component utilization data is available at a very specific level from the monitored client information handling systems, a substantially accurate and dynamic statistical wear calculation may be made to estimate service life. Furthermore, because of the granularity of the device component utilization data available to the intelligent management system, statistical models of several facets of estimated wear may be determined. Likewise, time-based statistical modeling of wear also permits IT managers to identify spikes in estimated wear such as peak need timeframes with respect to specific component devices or subgroups of component devices deployed in the enterprise within client information handling systems. For example, peak wear indicators may be determined for battery charging components, network interface components, display components, CPUs, GPUs, and the like. This identification of peak wear indicators with respect to component devices may be a powerful analysis tool for enterprise IT managers.

The statistical model of wear estimation may be determined based on several limitations placed on the data as described above. A statistical model for wear estimation can be based on associating usage levels and usage severity to wear levels. In one example, the usage level of one or more attributes can be directly mapped to a wear level. For example, if the number of power-on hours exceeds a power-on hour threshold value, the number of power cycles exceeds a power cycle threshold value, and the number of free falls exceeds a free fall threshold value, the statistical model of wear estimation can estimate a high wear level. The associations can be deterministic or within a probabilistic framework using statistical models for usage and wear. In another example, the relationship between usage levels and wear can be computed using a domain physics-based model. For example, temperature cycles and material properties can be used to determine fatigue damage using stress vs. number of cycles (S-N) curves. Changes in temperature and humidity conditions during shipping and storage of a client information handling system can be used to estimate corrosion conditions using a humidity power law. Fatigue damage and corrosion can be used as indicators of wear level.

In various embodiments, a statistical model of data for events and usage may be made with respect to particularized times, seasons, locations, class or sub-grouping of information handling system, component devices, or other parsing of the gathered device component utilization data. Similarly, as shown in certain embodiments herein, a statistical model for overall events and usage affecting wear across the enterprise or other group may be conducted as well by the intelligent service life management system. Depending on the analysis required, it is understood that the intelligent service life management system may conduct either parametric or non-parametric statistical analysis of the data to yield a demand estimation model with substantial accuracy and confidence levels for use by IT professionals for the enterprise or group. The parametric or non-parametric statistical model of wear may be made by the intelligent service life manager to determine probability distributions for event and usage levels depending on availability and accuracy of statistical parameter assumptions in accordance with several understood statistical analysis techniques.

Various statistical models may be used and applied to the variety of aspects of the component device utilization data described herein. For example, in an embodiment, a non-parametric kernel density estimate model may generate a probability density function to estimate events and usage affecting wear over a given period of time among a population of client information handling systems. In another embodiment, the kernel density estimate may be applied to data for specific to types of component devices or systems in the population of client information handling systems monitored for component device utilization data and including events and usage affecting wear. Other statistical modeling may be used as is understood. For example, a parametric statistical model may be used in which an assumed wear distribution function may be selected and the component device utilization data curve fit to the presumed base model in certain embodiments. Parametric models, such as normalized or lognormal parametric models, may yield additional accuracy assuming a properly selected base set of assumptions of the event and usage distribution over a population of client information handling systems or other aspects of component device utilization data as is understood. By statistical analysis of event and usage data for a plurality of client information handling systems throughout an enterprise, wear occurrence within the enterprise may be estimated with a reasonable certainty. Moreover, the component device specificity of the component device utilization data allows for statistical wear estimation at a granular level for classes of component devices across some or all of the enterprise. Further, the intelligent service life management system provides for flexibility in determining and accounting for events and usage of individual enterprise client information handling systems alone and in relation to the entire enterprise.

In accordance with at least one embodiment, the intelligent service life management system will apply event and usage rates to the modeled estimates of wear for the enterprise client information handling systems to yield estimated service life for information handling systems in the enterprise. The service life estimate may be a time-series estimate as above described above. In some embodiments, a wear rate estimate may be modeled by day of the week, seasonally, or otherwise. The estimated wear rate also may be broken down as before by classification of client information handling systems, by locations within the enterprise or group, or by component devices or subsets of component devices in various embodiments. The wear rates may be shifting rates depending on time of day usage for the enterprise or may shift depending on time of year. The estimated wear may be a location-based estimate or some combination of time or location basis. Wear rates may shift depending on location of the consuming client information handling system. Furthermore, adjustments to wear rate estimation similar to the above described adjustments may also factor into adjustment to the modeled estimates of service life. Other factors may also impact the cost of replacing information handling systems to an enterprise or group utilizing the intelligent service life management system of the present disclosure.

In accordance with at least one embodiment, the intelligent service life management system may have service life limitations or target caps by which IT personnel aim to control service and reliability issues. The service life limitations may be made according to budget or environmental considerations. The intelligent service life management system may indicate via the modeled time-based wear estimation time periods where estimated wear rates may reach one or more thresholds set during periods of time. These indicators may be used by IT personnel to provide for additional budgeting for wear or to implement measures to reduce wear. It is understood that the steps performed above need not be performed in any particular order. Additionally, some steps may not be performed or other steps may be added to the embodiment described above. Embodiments are contemplated to include any portions of the above embodiment in any order and in combination with other embodiments as is understood.

Figure 7:
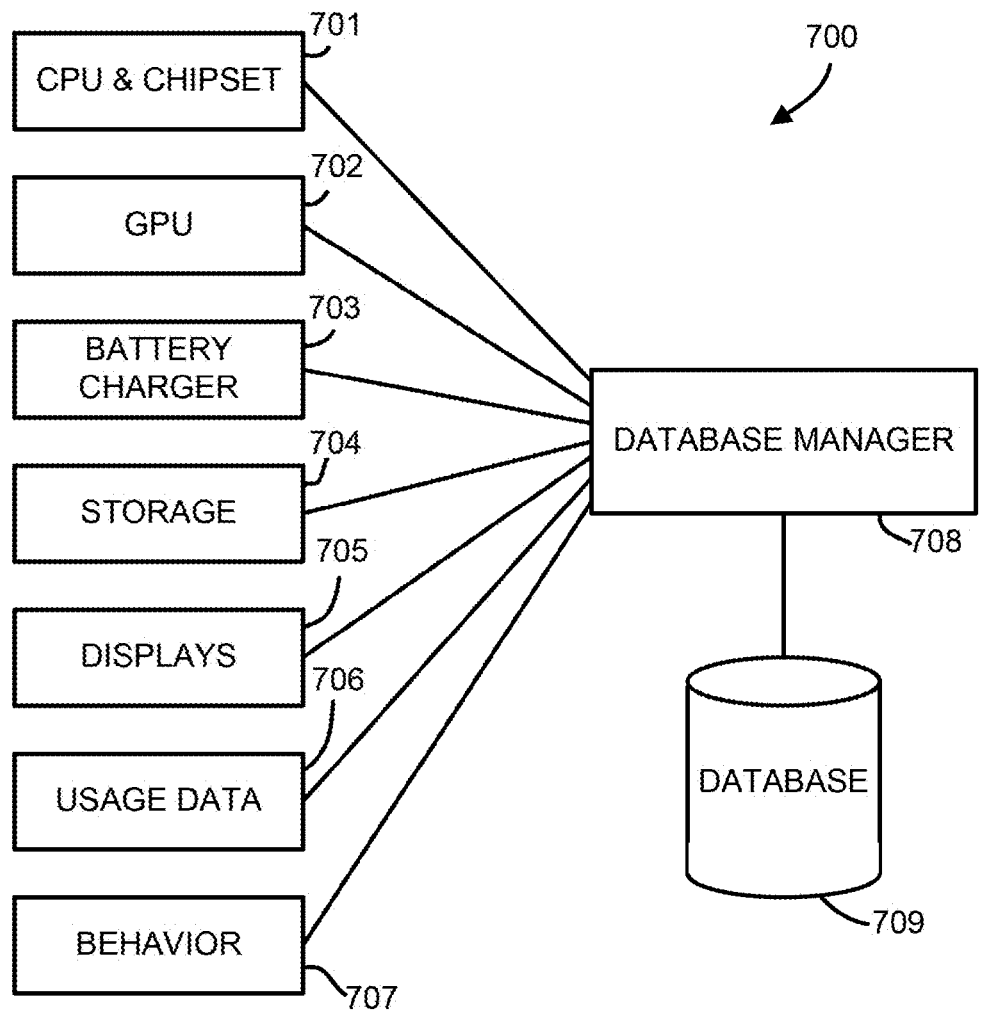
FIG. 7 is a graphical chart illustrating an example of service life management for one or more client information handling systems according to an embodiment of the present disclosure.

FIG. 7 is a graphical chart illustrating an example of service life management for one or more client information handling systems according to an embodiment of the present disclosure. FIG. 7 illustrates by graphic depiction the process of component device historical usage data collection including cumulative wear and development of end-of-life action determination via the intelligent service life management system of the present disclosure. Components, which can include, for example, CPU & chipset 701, GPU 702, battery charger 703, storage 704, displays 705, usage data 706, and behavior information 707, are coupled to database manager 708. Database manager 708 is coupled to database 709. The assortment of component devices or systems monitored for events and usage affecting wear and service life is shown at 701 through 707. The present embodiment may include direct power measurements made from power supply rails to component devices including the CPU, chipset, GPU, battery charger, storage/drive devices, displays, and other component devices as described above. Each monitored client information handling system, as described, may have intelligent service life management system agents conduct event and usage data collection. The monitoring and reporting system operating on the monitored client information handling system may report event and usage data and other component device utilization data back to the centralized intelligent service life management system and the monitoring system data repository. Other components, such as peripherals or network connected devices operating via the client information handling system may not have event and usage measurement of their own available. In such cases, usage and wear estimates may be made based on duty cycle of power consumption, component device operation, or monitoring of total system events and usage data.

Intelligent service life management system assesses overall event and usage data for the various component devices of the client information handling systems in a group or enterprise. The event and usage data along with additional component device utilization data may be used to determine time-series data illustrating usage and wear estimations according to statistical models applied. In an example embodiment for a monitored client information handling system, component device power consumption measurements may be summed to provide a total power consumption level. Data from a plurality of client information handling systems may be then summed or extrapolated across an enterprise.

Figure 8:
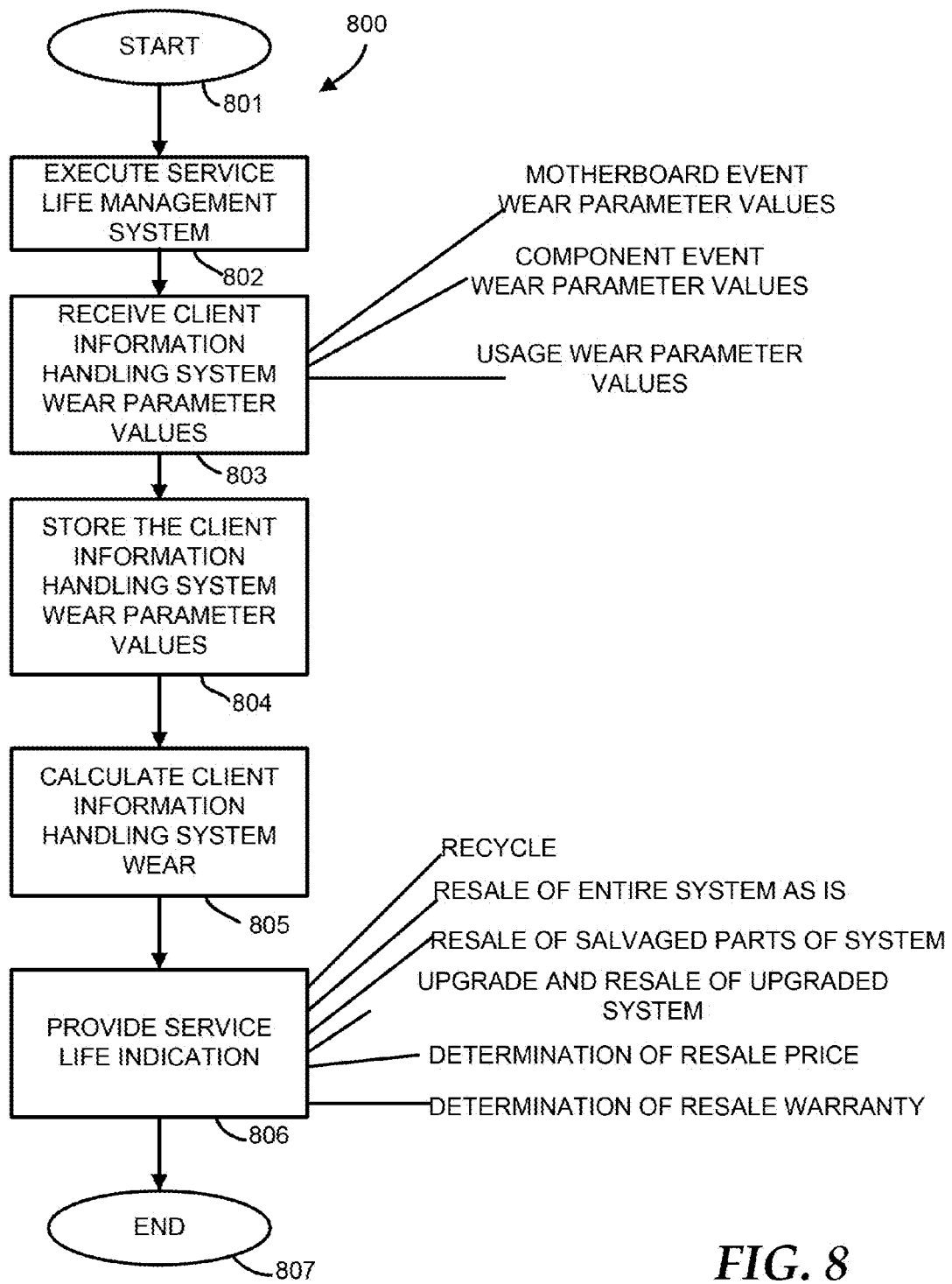
FIG. 8 is a flow diagram illustrating a method of information handling system service life management according to an embodiment of the present disclosure.

FIG. 8 is a flow diagram illustrating a method of information handling system service life management according to an embodiment of the present disclosure. Method 800 begins at block 801 and continues to block 802. In block 802, an application processor executes instructions of a service life management system for determining a disposition of a client information handling system. The application processor determines a statistical model of wear estimation for a plurality of other client information handling systems. From block 802, method 800 continues to block 803. At block 803, a network adapter receives, at the management information handling system, client information handling system wear parameter values representative of wear of the client information handling system, information handling system wear parameter values comprising motherboard event wear parameter values, component event wear parameter values, and usage wear parameter values. From block 803, method 800 continues to block 804. At block 804, a memory device stores the client information handling system wear parameter values. From block 804, method 800 continues to block 805. At block 805, the application processor calculates client information handling system wear based on the information handling system wear parameter values and the statistical model of wear estimation. From block 805, method 800 continues to block 806. At block 806, the application processor provides a service life indication for the client information handling system, the service life indication indicative of a disposition suitability.

Figure 9:
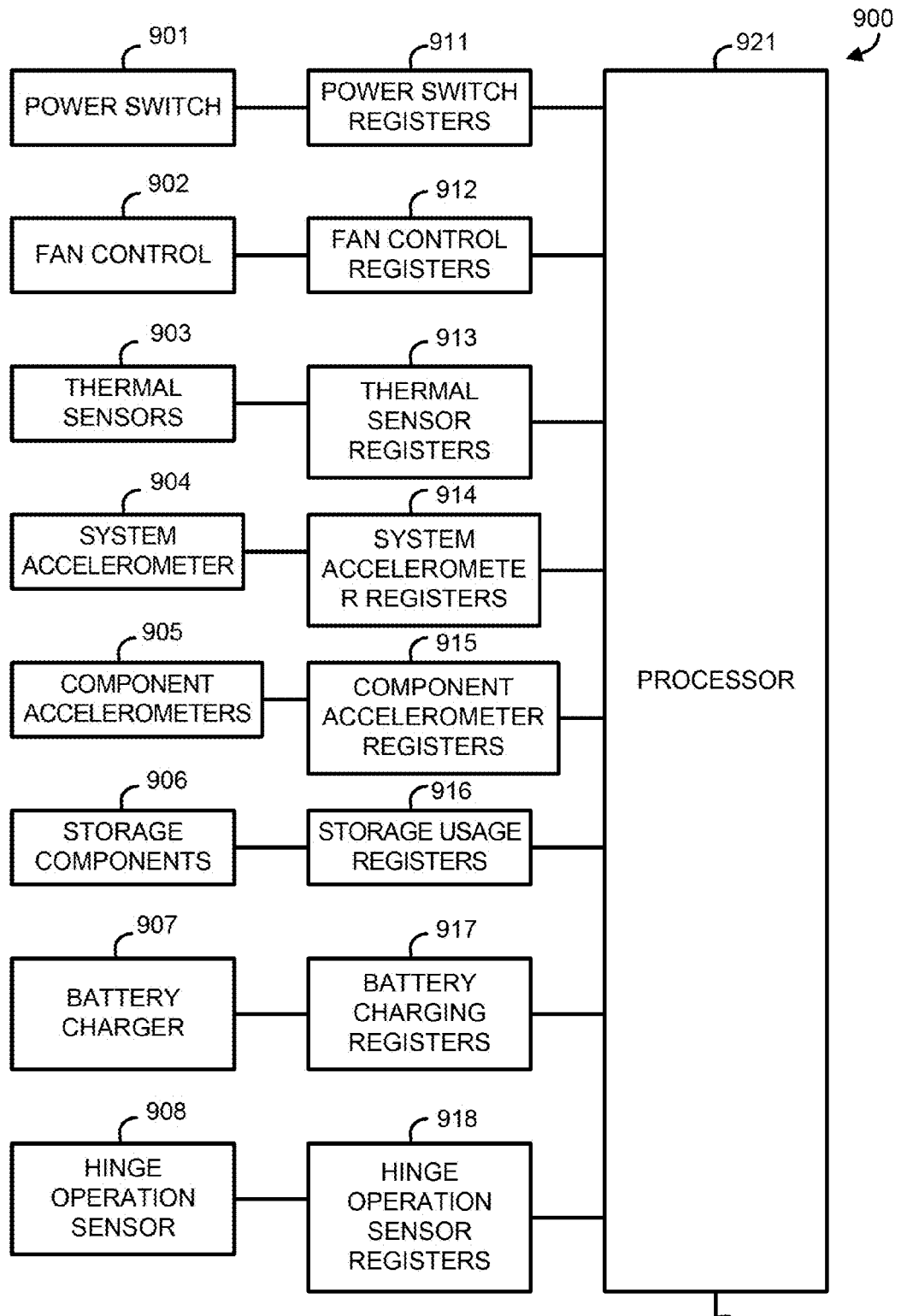
FIG. 9 is a graphical chart illustrating an example of a client information handling system architecture for wear estimation for client information handling systems according to an embodiment of the present disclosure.

FIG. 9 is a graphical chart illustrating an example of a client information handling system architecture for wear estimation for client information handling systems according to an embodiment of the present disclosure. An example of a client information handling system 900 in accordance with such an embodiment comprises power switch 901, fan control 902, thermal sensors 903, system accelerometer 904, component accelerometers 905, storage components 906, battery charger 907, hinge operation sensor 908 as sensors and other data sources. Client information handling system 900 comprises power switch registers 911, fan control registers 912, thermal sensor registers 913, system accelerometer registers 914, component accelerometer registers 915, storage usage registers 916, battery charging registers 917, and hinge operation sensor registers 918 as data registers. Client information handling system 900 comprises processor 921, which monitors the sensors and other data sources via their respective registers and provides indication 922.

In accordance with at least one embodiment, a method, at a management information handling system, comprising executing, via an application processor, instructions of a service life management system for determining a disposition of a client information handling system, wherein the application processor determines a statistical model of wear estimation for a plurality of other client information handling systems, receiving, at the management information handling system, client information handling system wear parameter values representative of wear of the client information handling system, information handling system wear parameter values comprising motherboard event wear parameter values, component event wear parameter values, and usage wear parameter values, storing the client information handling system wear parameter values in a memory device, calculating client information handling system wear based on the information handling system wear parameter values and the statistical model of wear estimation, providing a service life indication for the client information handling system, the service life indication indicative of a disposition suitability. In accordance with at least one embodiment, the disposition suitability is selected from group consisting of: suitability for recycling, suitability for intact resale, suitability for resale of salvaged parts, and suitability for resale after upgrading of at least one component. In accordance with at least one embodiment, the receiving, at the management information handling system, the client information handling system wear parameter value occurs during a first period of client information handling system operational use prior to disposition according to the service life indication. In accordance with at least one embodiment, the information handling system wear parameter values comprise a cumulative power-on time of the information handling system. In accordance with at least one embodiment, the information handling system wear parameter values comprise a freefall event value representative of a number of freefall events detected by the client information handling system. In accordance with at least one embodiment, the information handling system wear parameter values comprise a thermal shutdown value representative of a number of thermal shutdown events detected by the client information handling system. In accordance with at least one embodiment, the service life indication indicative of the disposition suitability comprises a plurality of disposition suitabilities, each of the plurality of disposition suitabilities pertaining to a different component of a plurality of components of the client information handling system.

In accordance with at least one embodiment, a management information handling system comprising an application processor executing instructions executing instructions of a service life management system for determining a disposition of a client information handling system, wherein the application processor determines a statistical model of wear estimation for a plurality of other client information handling systems, a network adapter for receiving, from a client information handling system, wear parameter values representative of wear of the client information handling system, the client information handling system wear parameter values comprising motherboard event wear parameter values, component event wear parameter values, and usage wear parameter values, and a memory device for storing the client information handling system wear parameter values in a memory device, the application processor configured to calculate client information handling system wear based on the client information handling system wear parameter values and to provide a service life indication for the client information handling system, the service life indication indicative of a disposition suitability. In accordance with at least one embodiment, the disposition suitability is selected from group consisting of: suitability for recycling, suitability for intact resale, suitability for resale of salvaged parts, and suitability for resale after upgrading of at least one component. In accordance with at least one embodiment, the network adapter receives the client information handling system wear parameter values during a first period of client information handling system operational use prior to disposition according to the service life indication. In accordance with at least one embodiment, the information handling system wear parameter values comprise a cumulative power-on time of the information handling system. In accordance with at least one embodiment, the information handling system wear parameter values comprise a freefall event value representative of a number of freefall events detected by the client information handling system. In accordance with at least one embodiment, the information handling system wear parameter values comprise a thermal shutdown value representative of a number of thermal shutdown events detected by the client information handling system. In accordance with at least one embodiment, the service life indication indicative of the disposition suitability comprises a plurality of disposition suitabilities, each of the plurality of disposition suitabilities pertaining to a different component of a plurality of components of the client information handling system.

In accordance with at least one embodiment, an information handling system comprises information handling system wear parameter sensors for obtaining information handling system wear parameter values representative of wear of the information handling system, the information handling system wear parameter sensors comprising a motherboard event wear parameter sensor for obtaining motherboard event wear parameter values, a component event wear parameter sensor for obtaining component event wear parameter values, and a usage wear parameter sensor for obtaining usage wear parameter values, and an application processor configured to calculate information handling system wear based on the information handling system wear parameter values and to determine a service life indication for the information handling system, wherein the service life indication is indicative of a disposition suitability. In accordance with at least one embodiment, the disposition suitability is selected from group consisting of: suitability for recycling, suitability for intact resale, suitability for resale of salvaged parts, and suitability for resale after upgrading of at least one component. In accordance with at least one embodiment, the information handling system wear parameter values comprise a cumulative power-on time of the information handling system. In accordance with at least one embodiment, the information handling system wear parameter values comprise a freefall event value representative of a number of freefall events detected by the client information handling system. In accordance with at least one embodiment, the information handling system wear parameter values comprise a thermal shutdown value representative of a number of thermal shutdown events detected by the client information handling system. In accordance with at least one embodiment, the service life indication indicative of the disposition suitability comprises a plurality of disposition suitabilities, each of the plurality of disposition suitabilities pertaining to a different component of a plurality of components of the client information handling system.

While embodiments have been described herein with respect to specific types of client information handling system wear parameter sensors, such as power sensors, duty cycle sensors, thermal stress sensors, system storage condition sensors, mechanical stress sensors, other embodiments may be applied to other types of interfaces. For example, if it is desirable to provide other or additional types of interfaces, an embodiment using such other or additional types of interfaces may be implemented in accordance with the disclosure herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, at a management information handling system, comprising:
    executing, via an application processor, instructions of a service life management system for determining a disposition of a client information handling system, wherein the application processor determines a statistical model of wear estimation for a plurality of other client information handling systems;
    receiving, at the management information handling system, client information handling system wear parameter values representative of wear of the client information handling system, the client information handling system wear parameter values comprising motherboard event wear parameter values, component event wear parameter values, and usage wear parameter values;
    storing the client information handling system wear parameter values in a memory device;
    calculating client information handling system wear based on the client information handling system wear parameter values and the statistical model of wear estimation;
    providing a service life indication for the client information handling system based on the calculated client information handling system wear, the service life indication indicative of a disposition suitability.

2. The method of claim 1 wherein the disposition suitability is selected from a group consisting of: suitability for recycling, suitability for intact resale, suitability for resale of salvaged parts, and suitability for resale after upgrading of at least one component.

3. The method of claim 2 wherein the receiving, at the management information handling system, the client information handling system wear parameter value occurs during a first period of client information handling system operational use prior to a disposition time.

4. The method of claim 1 wherein the usage wear parameter values comprise a cumulative power-on time of the information handling system.

5. The method of claim 1 wherein the information handling system wear parameter values comprise a freefall event value representative of a number of freefall events detected by the client information handling system.

6. The method of claim 5 wherein the information handling system wear parameter values comprise a thermal shutdown value representative of a number of thermal shutdown events detected by the client information handling system.

7. The method of claim 1 wherein the service life indication indicative of the disposition suitability comprises a plurality of disposition suitabilities, each of the plurality of disposition suitabilities pertaining to a different component of a plurality of components of the client information handling system.

8. A management information handling system comprising:
    an application processor executing instructions of a service life management system for determining a disposition of a client information handling system, wherein the application processor determines a statistical model of wear estimation for a plurality of other client information handling systems;
    a network adapter for receiving, from the client information handling system, wear parameter values representative of wear of the client information handling system, the client information handling system wear parameter values comprising motherboard event wear parameter values, component event wear parameter values, and usage wear parameter values;
    a memory device for storing the client information handling system wear parameter values in a memory device, the application processor configured to calculate client information handling system wear based on the client information handling system wear parameter values and to provide a service life indication for the client information handling system based on the calculated client information handling system wear, the service life indication indicative of a disposition suitability.

9. The management information handling system of claim 8 wherein the disposition suitability is selected from a group consisting of: suitability for recycling, suitability for intact resale, suitability for resale of salvaged parts, and suitability for resale after upgrading of at least one component.

10. The management information handling system of claim 8 wherein the network adapter receives the client information handling system wear parameter values during a first period of client information handling system operational use prior to disposition according to the service life indication.

11. The management information handling system of claim 8 wherein the usage wear parameter values comprise a cumulative power-on time of the client information handling system.

12. The management information handling system of claim 8 wherein the client information handling system wear parameter values comprise a freefall event value representative of a number of freefall events detected by the client information handling system.

13. The management information handling system of claim 8 wherein the client information handling system wear parameter values comprise a thermal shutdown value representative of a number of thermal shutdown events detected by the client information handling system.

14. The management information handling system of claim 8 wherein the service life indication indicative of the disposition suitability comprises a plurality of disposition suitabilities, each of the plurality of disposition suitabilities pertaining to a different component of a plurality of components of the client information handling system.

15. An information handling system comprising:
information handling system wear parameter sensors for obtaining information handling system wear parameter values representative of wear of the information handling system, the information handling system wear parameter sensors comprising a motherboard event wear parameter sensor for obtaining motherboard event wear parameter values, a component event wear parameter sensor for obtaining component event wear parameter values, and a usage wear parameter sensor for obtaining usage wear parameter values;
an application processor configured to calculate information handling system wear based on the information handling system wear parameter values and to determine a service life indication for the information handling system based on the calculated information handling system wear, wherein the service life indication is indicative of a disposition suitability.

16. The information handling system of claim 15 wherein the disposition suitability is selected from a group consisting of: suitability for recycling, suitability for intact resale, suitability for resale of salvaged parts, and suitability for resale after upgrading of at least one component.

17. The information handling system of claim 15 wherein the information handling system wear parameter sensors comprise:
a hinge operation sensor to detect operation of a hinge of the information handling system.

18. The information handling system of claim 17 wherein the information handling system wear parameter sensors comprise an accelerometer configured to detect freefall events and the information handling system wear parameter values comprise the freefall event value representative of a number of the freefall events detected by the client information handling system.

19. The information handling system of claim 15 wherein the information handling system wear parameter values comprise a thermal shutdown value representative of a number of thermal shutdown events detected by the client information handling system.

20. The information handling system of claim 15 wherein the service life indication indicative of the disposition suitability comprises a plurality of disposition suitabilities, each of the plurality of disposition suitabilities pertaining to a different component of a plurality of components of the client information handling system.

* * * * *